M. MONDRIUK.
MULTIPLE PLOW.
APPLICATION FILED MAR. 21, 1921.
1,395,447.
Patented Nov. 1, 1921.
2 SHEETS—SHEET 1.
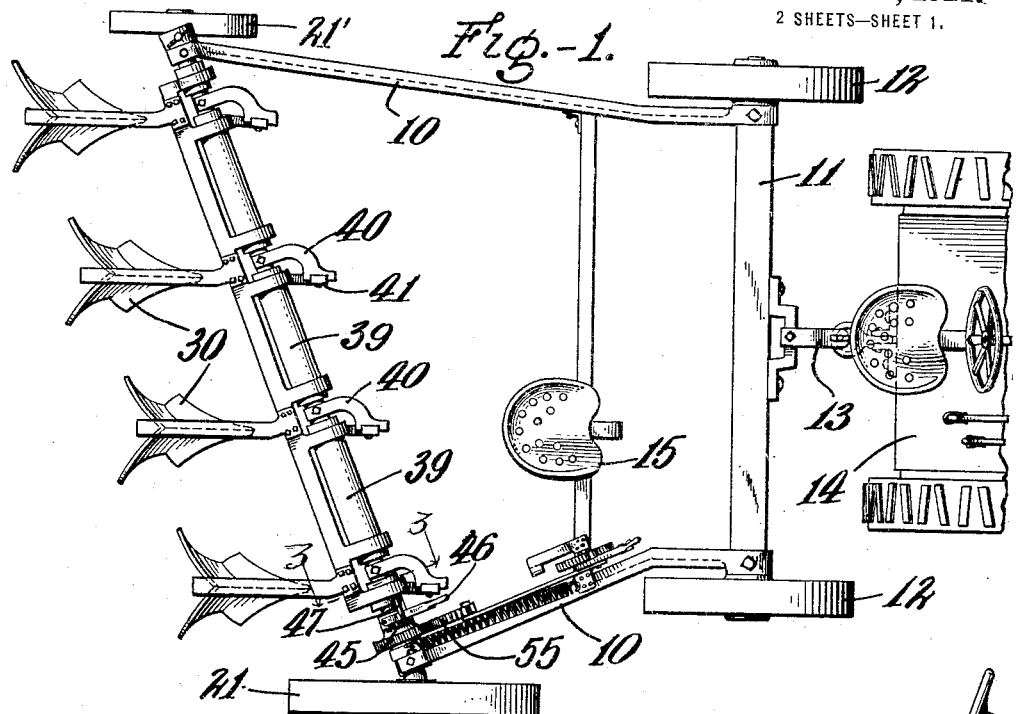
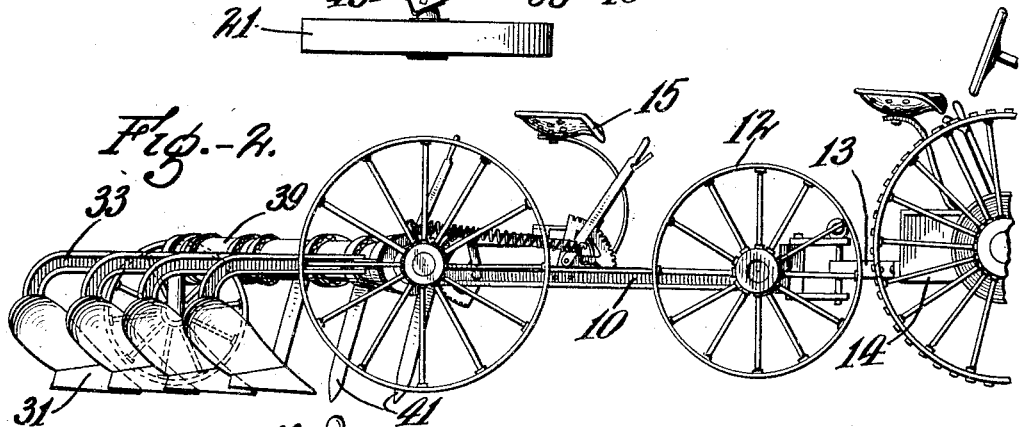
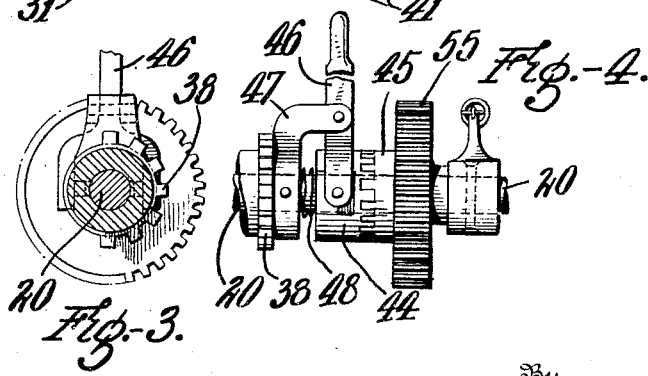
Inventor
Michael Mondriuk

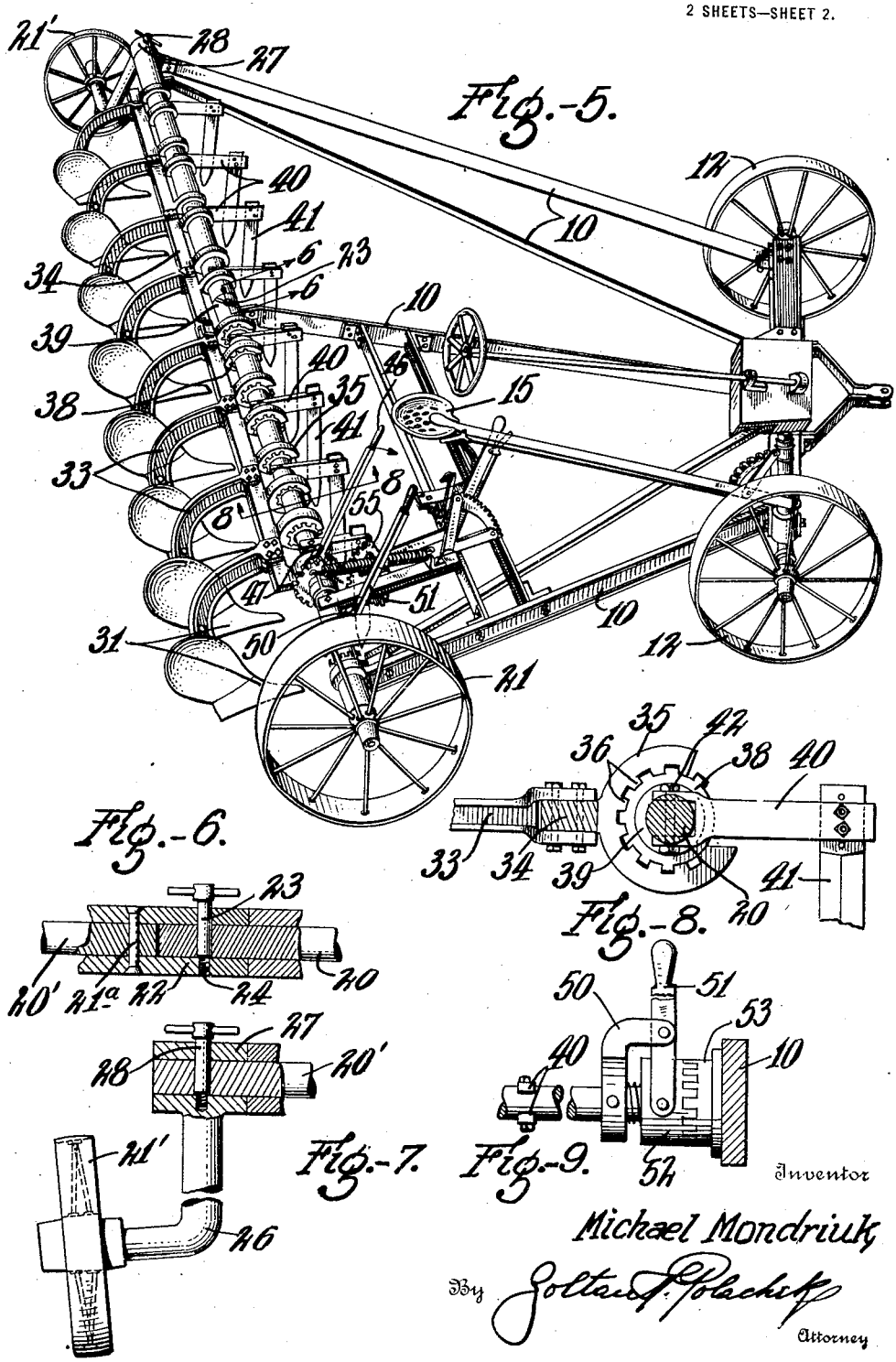

UNITED STATES PATENT OFFICE.

MICHAEL MONDRIUK, OF AKRON, OHIO.

MULTIPLE PLOW.

1,395,447. Specification of Letters Patent. Patented Nov. 1, 1921.

Application filed March 21, 1921. Serial No. 453,986.

*To all whom it may concern:*

Be it known that I, MICHAEL MONDRIUK, a citizen of Russia, and resident of Akron, in the county of Summit and State of Ohio, have invented certain new and useful Improvements in Multiple Plows, of which the following is a specification.

This invention relates to plows, having more particular reference to multiple plows, generally known as gang plows.

The invention has for an object to provide a new and improved construction for a gang plow having novel means for adjustment and manipulation of the various plow elements thereof.

For further comprehension of the invention, and of the objects and advantages thereof, reference will be had to the following description and accompanying drawings, and to the appended claims in which the various novel features of the invention are more particularly set forth.

Figure 1 of the drawings is a plan view of a gang plow embodying the invention, showing the arrangement in which a reduced number of plow elements are employed.

Fig. 2 is a side view thereof.

Fig. 3 is a detail transverse section, taken on the line 3—3 of Fig. 1 showing the means for adjusting the plows vertically.

Fig. 4 is a side view of the means shown in Fig. 3.

Fig. 5 is a perspective view of the plow as provided with the full number of plow elements.

Fig. 6 is a fragmentary axial section of the main shaft or axle, indicating particularly the joint employed for extending said shaft to receive the full number of plow elements shown in Fig. 5.

Fig. 7 is a detail elevation, partly in section, showing the means for connecting the running wheels to the said main shaft.

Fig. 8 is a detail transverse section of said main shaft, taken along the general plane indicated by the line 8—8 on Fig. 5 and illustrating particularly the means for removably securing the plow elements as a unit to said main shaft.

Fig. 9 is a similar view to Fig. 4 of the means for adjusting the knives.

The plow frame may comprise a pair of side bars 10 connected at their forward ends to an axle 11 mounted on wheels 12, the axle 11 being connected by a draft attachment indicated generally at 13 to a tractor 14.

The driver's seat 15 may be suitably mounted on a cross bar 16 extending between the side frames 10.

Suitably fixed to the rear ends of the side frames 10 is a diagonally arranged main shaft or axle 20 which is supported on wheels 21, 21' and which carries the series of plows. In Fig. 1 I have shown four of these plows while in Fig. 5 I show eight of these plows. To accommodate the double or single set of plows as desired I provide a removable extension 20' for the main shaft 20 which may be attached or detached as desired. To this end the shaft extension 20' has fixed to its inner end, as by the rivet 21ᵃ a projecting sleeve 22 which forms a socket to receive the end of the shaft 20, the two shaft sections being locked together by a pin 23 passing through suitable registering openings in the sleeve 22 and shaft 20 and having a diminished screw threaded end 24 which engages in a complementary boring in the sleeve. To permit of the wheel 21' being placed either on the end of the shaft 20 or the extension 20' the wheel may be mounted on a bracket 26 having an integral sleeve 27 at its upper end, this sleeve being locked to the shaft end by a pin 28 similar to the pin 23.

In connection with my improved plow I may employ either the double faced plow elements 30, shown in Fig. 1, or the single faced plow elements, or plowshares 31, shown in Fig. 5, these plowshares being mounted as follows: These plowshares are individually secured to rigid arms 33 fixed at their forward ends to a horizontal bar 34 extending parallel to the axle 20 just at the rear thereof. Formed on this bar 34 are arcuate collars 35 having serrated inner walls 36 engaging complementary serrations on other collars 38 fixed to a series of sleeves 39 spaced along the shaft and loose thereon, this arrangement making a rigid connection between all the sleeves as will be apparent.

Fixed to the shaft 20, between the sleeves 39, are a series of forwardly extending arms 40 carrying colters 41 at their forward ends. These arms 40 are here shown as secured to the shaft 20 by means of bolts 42 passing through the forked rear ends of the arms which straddle the shaft. The sleeves 39 are adjustably fixed on the shaft 20 by a clutch member 44 slidable on the shaft and engaging clutch member 45 fixed on said shaft the clutch member 44 having a nonrotative connection with an operating lever 46 fulcrumed on an ear 47 projecting rigidly from one of the sleeves 39, a spring 48 normally urging the clutch member 44 against the clutch member 45. By first swinging the lever 46 longitudinally of the shaft 20, the clutch member 45 is freed and the lever may then be swung around the shaft, rotating the sleeves 39 and raising or lowering the plowshares which may thus be set in different positions, vertically considered. I may also provide for adjustment of the colters 41 in a similar manner, as shown in Fig. 9, the shaft 20 having fixed thereon an ear 50 to which is fulcrumed a lever 51 connected to a clutch member 52 loose on shaft and engaging a clutch member 53 fixed to the adjacent side frame 10, this adjustment device being here applied only to the form of plow shown in Fig. 5.

The plow may also be provided with the usual means, indicated at 55, for momentarily raising or lowering the plowshares. When the plow is equipped with the full number of plows, as in Fig. 5, I provide additional frame members 10 to support the extended shaft 20'.

The plowshares 31 may be readily removed as a unit when desired by first moving the bar 34 longitudinally along the shaft until the arcuate collars are free of the sleeves 39. When the parts are assembled the sleeve 27 prevents the said longitudinal movement of the bar 34.

Having thus described my invention what I claim as new and desire to protect by Letters Patent of the United States is as follows:—

1. In a gang plow, a frame, a main shaft, wheels supporting said main shaft, a series of plowshares, arcuate collars to which said plowshares are fixed, sleeves on said main shaft, and means for engaging and disengaging said arcuate collars from said sleeves by movement of said arcuate collars longitudinally of the shaft.

2. In a gang plow, a frame, a main shaft, wheels supporting said main shaft, a series of plowshares, arcuate collars to which said plowshares are fixed, sleeves on said main shaft, and means for engaging and disengaging said arcuate collars from said sleeves by movement of said arcuate collars longitudinally of the shaft, and means for locking said sleeves to said shaft or releasing said sleeves from said shaft.

3. In a gang plow, a frame, a main shaft, wheels supporting said main shaft, a series of plowshares, a bar to which said plowshares are fixed, arcuate collars projecting rigidly from said bar, a series of sleeves loose on said shaft, collars fixed on said sleeves, said collars having interlocking serrated faces, and means attached to one of said sleeves whereby the plowshares as a unit are adjustably connected to the said shaft.

Signed at Akron, in the county of Summit, and State of Ohio, this 16 day of March, A. D. 1921.

MICHAEL MONDRIUK.